(12) United States Patent
Tomita

(10) Patent No.: US 7,251,686 B1
(45) Date of Patent: Jul. 31, 2007

(54) APPARATUS MANAGEMENT UNIT AND SYSTEM FOR DETERMINING THE VALIDITY OF DATA/MAIL BASED ON ITS EXPIRATION DATE AND/OR TIME

(75) Inventor: Atsushi Tomita, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/547,673

(22) Filed: Apr. 12, 2000

(30) Foreign Application Priority Data

Apr. 16, 1999 (JP) ................... 11-109650

(51) Int. Cl.
*G06F 15/173* (2006.01)
*G06F 15/16* (2006.01)

(52) U.S. Cl. ...................... 709/223; 709/206
(58) Field of Classification Search ................ 719/223; 709/224, 206; 347/19; 358/3.23; 379/1.01, 379/1.03; 700/104, 105, 106, 108, 109, 150, 700/171, 174

See application file for complete search history.

(56) References Cited

U.S. PATENT DOCUMENTS

| | | | | | |
|---|---|---|---|---|---|
| 4,304,001 A | * | 12/1981 | Cope | ............................... | 714/4 |
| 4,399,531 A | * | 8/1983 | Grande et al. | ............... | 370/216 |
| 5,184,179 A | * | 2/1993 | Tarr et al. | ...................... | 399/8 |
| 5,345,558 A | * | 9/1994 | Opher et al. | ................ | 709/236 |
| 5,361,334 A | * | 11/1994 | Cawley | ...................... | 709/243 |
| 5,510,797 A | * | 4/1996 | Abraham et al. | ........... | 342/352 |
| 5,603,059 A | * | 2/1997 | Churchill et al. | ............. | 710/36 |
| 5,606,705 A | * | 2/1997 | Randall et al. | ............. | 709/203 |
| 5,793,382 A | * | 8/1998 | Yerazunis et al. | .......... | 345/474 |
| 5,918,040 A | * | 6/1999 | Jarvis | ......................... | 709/400 |
| 5,923,848 A | * | 7/1999 | Goodhand et al. | .......... | 709/219 |
| 6,003,070 A | * | 12/1999 | Frantz | ........................ | 709/206 |
| 6,104,712 A | * | 8/2000 | Robert et al. | ............... | 370/389 |
| 6,178,442 B1 | * | 1/2001 | Yamazaki | ................... | 709/206 |
| 7,080,127 B1 | * | 7/2006 | Hickman et al. | ........... | 709/208 |

FOREIGN PATENT DOCUMENTS

| | | |
|---|---|---|
| JP | 4-318731 | 11/1992 |
| JP | 4-318859 | 11/1992 |
| JP | 7115437 | * 5/1995 |
| JP | 08-297616 | 11/1996 |
| JP | 10-164182 | 6/1998 |
| WO | WO 95/26596 | * 10/1995 |

OTHER PUBLICATIONS

RD 330036 Expiration Date as part of mail item for return to sender, Oct. 1991 (Anonymous), p. 1-2.*
RFC 2018: TCP Selective Acknowledgment Options, Mathis, M., et. al., Oct. 1996.*
TCP/IP Illustrated, The Protocols, W. Richard Stevens, vol. 1, 1994, (section 24.5 Timestamp Option), p. 349-351.*

* cited by examiner

*Primary Examiner*—Beatriz Prieto
(74) *Attorney, Agent, or Firm*—McDermott Will & Emery LLP

(57) ABSTRACT

In a management system that manages a plurality of apparatuses by use of a centralized management unit connected to the apparatuses via a network, the expiration date and time of a mail (data) transmitted from the centralized management unit is confirmed, and an expired mail is not used for apparatus management.

18 Claims, 15 Drawing Sheets

APPARATUS MANAGEMENT UNIT AND SYSTEM FOR DETERMINING THE VALIDITY OF DATA/MAIL BASED ON ITS EXPIRATION DATE AND/OR TIME

RELATED APPLICATION

This application is based on application No. 11-109650 filed in Japan, the entire content of which is hereby incorporated by reference.

BACKGROUND OF THE INVENTION

1. Field of the Invention

The present invention relates to an apparatus management unit that transmits data of a connected apparatus to a centralized management unit and manages the apparatus based on apparatus management data transmitted from the centralized management unit. Moreover, the present invention relates to an apparatus management system that manages a plurality of apparatuses via a network by use of a centralized management unit.

2. Description of the Related Art

Japanese Laid-open Patent Application No. H4-318731 proposes an apparatus management unit connected to a centralized management unit via the public telephone line. The apparatus management unit receives parameters associated with connection control such as the telephone number of the centralized management unit and the identification number of an apparatus from the centralized management unit. Japanese Laid-open Patent Application No. H4-318859 proposes an apparatus management unit that, when something is wrong with a connected copying machine, stops the operation of the copying machine in accordance with an instruction from a centralized management unit.

Examples of the system in which a centralized management unit and an apparatus management unit are connected as described above include not only the system in which these units are connected by use of the public telephone line but also a system that performs communication by use of the Internet and a radio communication system that uses a PHS (Personal Handy Phone System) or a cellular phone as a terminal unit with the diversification of the communication technology.

In a system that performs data communication between terminals by use of the public telephone line, data is transmitted and received substantially in real time because the line is occupied for the data transmission and reception. On the contrary, a system that transmits and receives data as packets between an apparatus management unit and a centralized management unit like electric mails using the Internet is inferior to the system using the public telephone line in real-time data transmission and reception, because the packets are delivered to the destination address by being transferred in a bucket brigade manner. That is, there is a possibility that the arrival of a mail at the destination address is delayed, for example, because of a trouble on the transfer path.

In an apparatus management system that manages apparatuses connected to a plurality of apparatus management units by transmitting and receiving apparatus management data between a centralized management unit and the apparatus management units, there are cases where apparatus management data has already become obsolete when it arrives because of a delay in arrival of the mail (apparatus management data) from the centralized management unit at the apparatus management unit. In such cases, if the received apparatus management data is used for management, the apparatus will be managed inappropriately, so that the condition of the apparatus can become worse.

SUMMARY OF THE INVENTION

An object of the present invention is to solve the above-mentioned problem.

Another object of the present invention is to, when a plurality of apparatuses are managed via a network by use of a centralized management unit, prevent the apparatuses from being managed based on old data.

Yet another object of the present invention is to, in a system in which apparatus management data is transmitted and received between an apparatus management unit and a centralized management unit as a packet, prevent management from being inappropriately performed when the arrival of data from the centralized management unit at the apparatus management unit is delayed.

These and other objects are attained by a controller having a receiving unit for receiving a mail transmitted from a management unit, an analyzing unit for analyzing the received mail to obtain data on an expiration date and time, and a control unit for controlling an apparatus based on the received mail when the validity of the mail has not expired.

Moreover, the above-mentioned objects of the present invention are attained by a management system having, an apparatus, a management unit being connected to the apparatus via a network and for transmitting data for managing the apparatus, and a control unit being connected between the management unit and the apparatus, for determining whether the validity of data transmitted from the management unit has expired or not, and for permitting transmission of data whose validity has not expired to the apparatus.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

Hereinafter, an embodiment of the present invention will be described. In this embodiment, description will be given with copying machines as the apparatuses and with data terminals (DTs) as the apparatus management units. That is, the present invention will be described with respect to a management system in which data terminals (user side units) connected to the copying machines are capable of transmitting and receiving data to and from the centralized management unit (center side unit) via the Internet. For simplification, description will be given with respect to one data terminal (DT) as the user side unit.

[1] System Configuration

Figure 1:
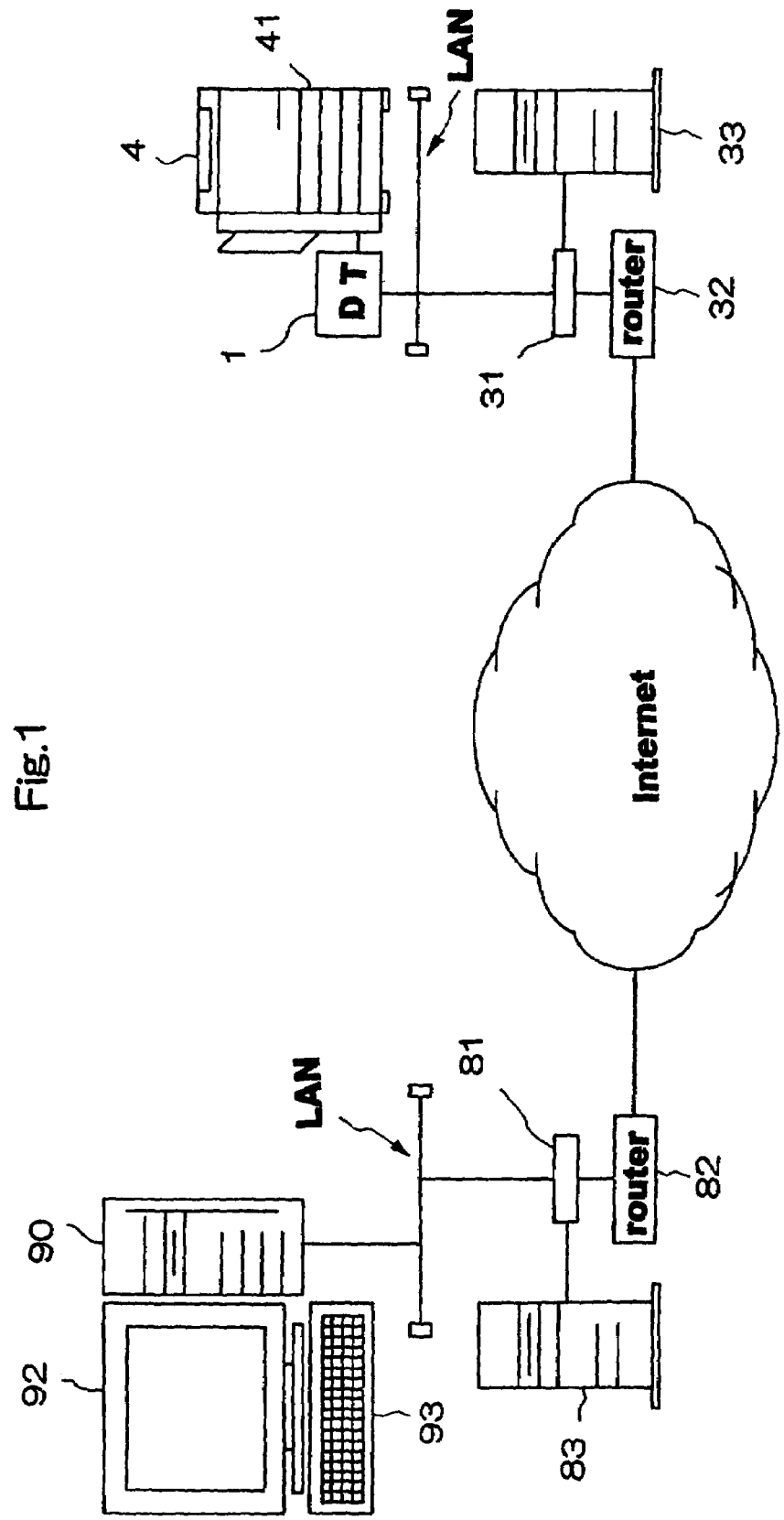
FIG. 1 is a schematic view showing the configuration of a management system.
Figure 2:
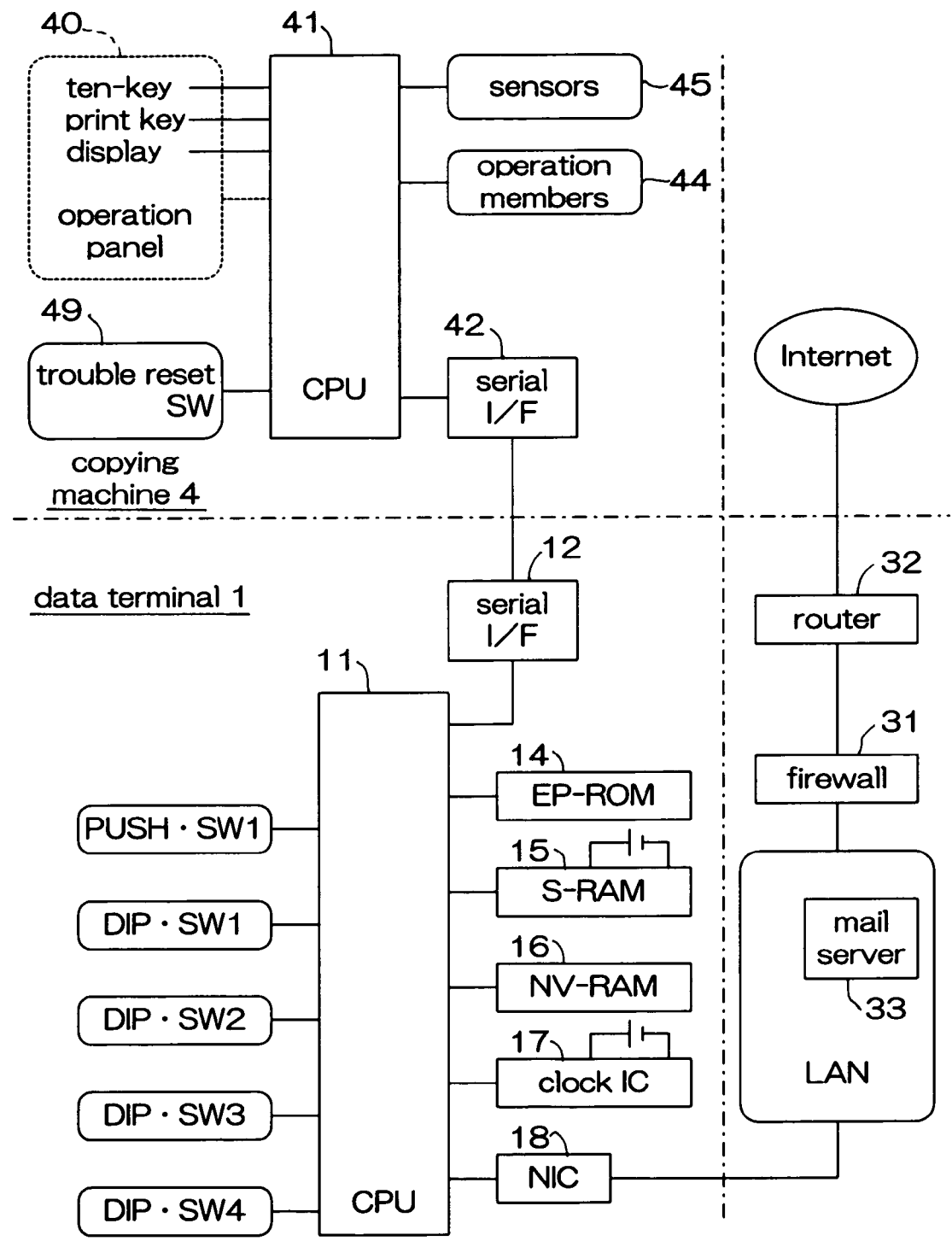
FIG. 2 is a block diagram showing part of the management system.
Figure 3:
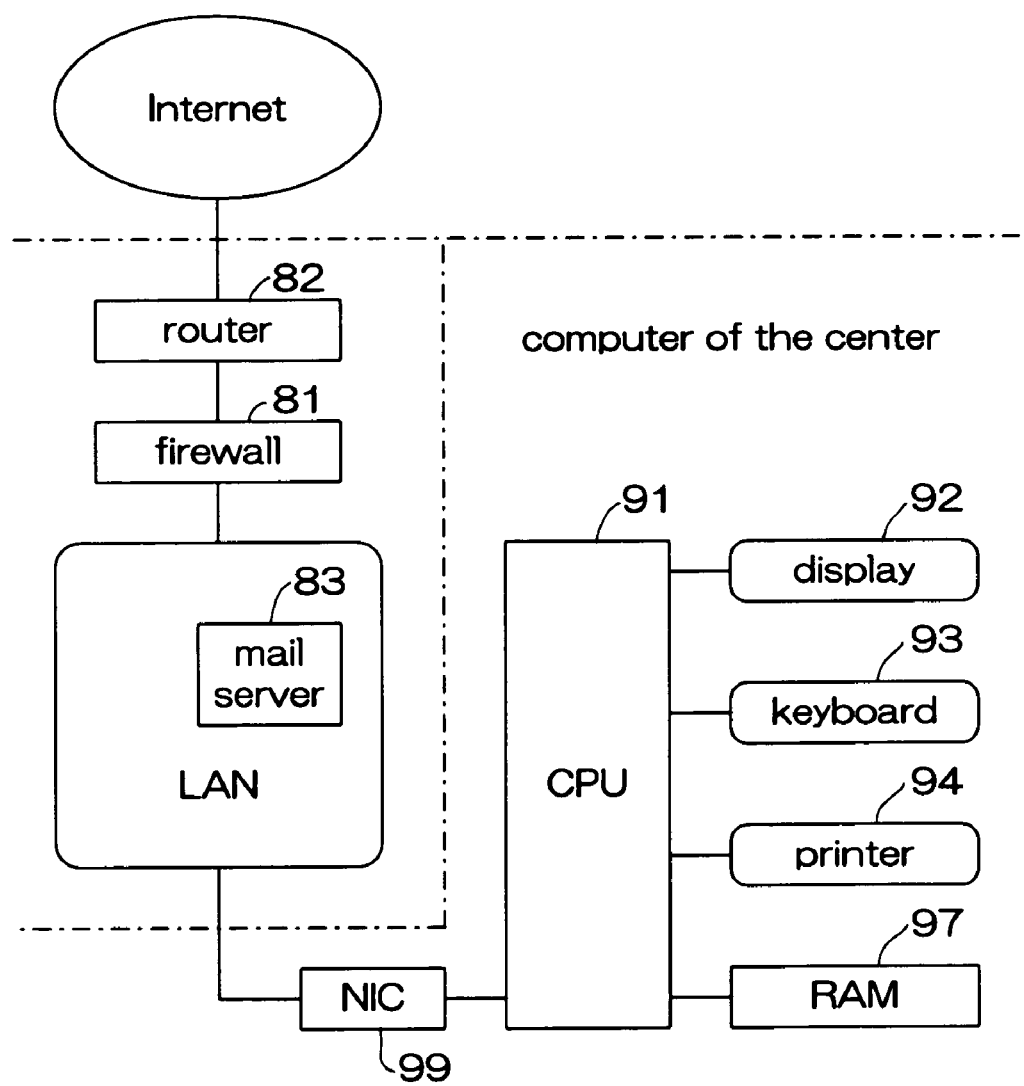
FIG. 3 is a block diagram showing part of the management system.

FIG. 1 is an explanatory view of the configuration of the management system. FIGS. 2 and 3 are block diagrams of the management system. On the user is side, a copying machine 4 and a data terminal 1 are placed. The data terminal 1 incorporates an NIC (network interface card) having a function to transmit and receive electric mails via the Internet. The data terminal 1 is connected to a firewall 31 via a LAN (local-area network) and is connected to the Internet via a router 32. To the LAN, a mail server 33 that holds Internet mails is connected.

The data terminal 1 takes in various pieces of information on the copying machine 4, performs predetermined processing on the information, and transmits it to a center side computer 90. On the side of the center, various diagnoses of the copying machine 4 are performed based on the data transmitted from the data terminal 1, and copying machine management data is summed up.

On the side of the center, the computer 90 is provided. The computer 90 is provided with a CPU 91, and a display 92 and a keyboard 93 are connected to the computer 90. To communicate with the data terminal 1, the computer 90 is connected to a firewall 81 via a LAN and is connected to the Internet via a router 82. To the LAN, a mail server 83 that holds Internet mails are connected.

These apparatus and devices will be described.

[1-1] Copying Machine

The copying machine 4 scans an original image and forms a copy image on paper. A CPU 41 of the copying machine 4 counts the count values of counters based on which the center calculates the amount billed for copying, and the count values are transmitted to a CPU 11 of the data terminal 1 via a serial I/F (interface) 42 and a serial I/F 12. The counters are as follows: a total counter indicating the number of times of paper ejection; a sheet-size-specific counter indicating the number of used sheets of paper of each sheet size; a counter serving as a guide for maintenance; a portion-specific jam counter indicating the number of times of paper jam occurrence in each portion; a portion-specific trouble counter indicating the number of times of trouble occurrence in each portion; and a PM counter serving as a guide for performing the periodical maintenance of each part. The PM counter counts the number of times of use of each part, and the count value thereof serves, for example, as a guide for the timing of part replacement.

At the copying machine 4, various element data (for example, the time necessary for paper conveyance, the surface potential of the photoconductor drum, the concentration of the toner in the developer, the exposure amount of the photoconductor drum, the development bias voltage, the amount of the toner adhering to the surface of the photoconductor drum, and the grid voltage of the charger) that affect the image forming process are detected by various kinds of sensors 45 disposed in various portions of the copying machine 4, and are taken in the CPU 41 and processed. Then, the processed data are transmitted to the CPU 11 of the data terminal 1 via the serial I/F 42 and the serial I/F 12.

[1-2] Data Terminal

The data terminal 1 is an apparatus management unit that receives data transmitted from the copying machine 4 via the serial I/F 42 and the serial I/F 12, and when a predetermined transmission condition (a condition for a transmission flag to be set; details thereof will be described later) is satisfied, activates an NIC 18 and transmits, as packets, copying machine management data (the above-mentioned element data, count data or the like) to which the address of the CPU 91 of the center is added.

Figure 4A:
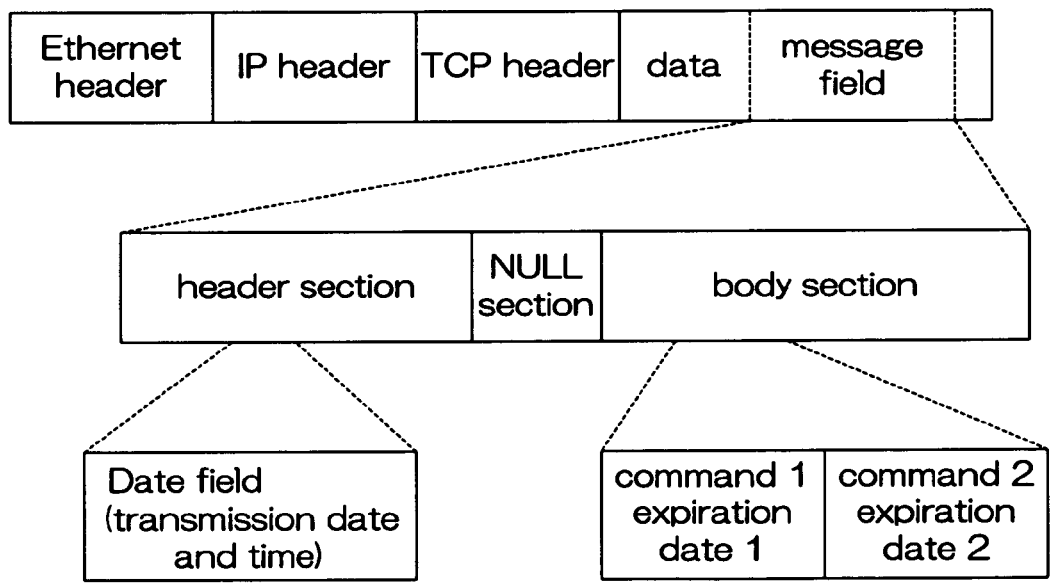
FIG. 4(a) is a view showing the configuration of packet data.

The data configuration of the packet data is shown in FIG. 4(a).

As shown in the figure, the packet data comprises an Ethernet header, an IP header, a TCP header and a data section. The Ethernet header, the IP header and the TCP header include the information shown in the figure. The data section includes a message field. The message field includes a header section, a body section and a null line (blank) situated therebetween. The header section includes a date field where the transmission date and time is written. In the body section, arbitrary data may be written. For example, in the case of a packet transmitted from the center to a certain data terminal 1, a command and expiration date and time information corresponding to the command may be written in the body section.

To the CPU 11 of the data terminal 1 are connected a ROM (read only memory) 14 in which a control program is stored, a nonvolatile memory 16 for storing the mail address of the center and the like therein, a battery-backed working system RAM (random-access memory) 15, and a battery-backed clock IC (integrated circuit) 17.

The CPU 11 receives the data transmitted from the CPU 41 of the copying machine 4 via the serial I/F 42 and the serial I/F 12, and performs predetermined processing thereon. The CPU 11 also performs a predetermined operation, sets a predetermined mode or the like in accordance with an operation input from operation switches (push switch PUSHSW1 and four dip switches DIPSW1 to DIPSW4). The dip switch DIPSW1 is for setting a mode to input the mail address of the computer 90 of the center. The dip switch DIPSW2 is for setting a mode to input the ID (identification) number for identifying the data terminal 1 (DTID). The dip switch DIPSW3 is for setting a mode to input the ID number for identifying the center (center ID). The dip switch DIPSW4 is for setting an initial setting mode. The push switch PUSHSW1 is for commanding the execution of initial transmission or user transmission described later.

Figure 4B:
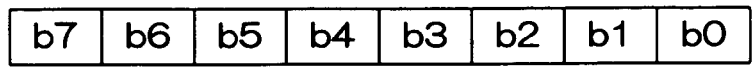
FIG. 4(b) is a view showing the configuration of code data.

Eight-bit data comprising bits b7 to b0 and being input from the serial I/F 12 to the data terminal 1 is configured as shown in FIG. 4(b). That is, a paper ejection code representing the ejection of paper is expressed by the falling edge (the change from 1 to 0) of the bit b0. A jam code representing the occurrence of paper jam is expressed by the bit b7=1 and the bit b6=0. A trouble code representing the occurrence of a trouble is expressed by the bit b7=1 and the bit b6=1. The 8-bit data is periodically input to the data terminal 1, and is also input when paper jam or a trouble occurs at the copying machine 4.

The control CPU 11 is capable of commanding the NIC 18 to transmit an Internet mail to the mail address of the center. The content of the data (data for managing the copying machine 4) transmitted from the control CPU 11 to the center side CPU 91 is dependent on the kind of the set transmission flag as described later.

[1-3] Center

The center is a computer apparatus capable of transmitting and receiving packet data via the Internet to and from each of the data terminals 1 provided in a multiplicity of users' copying machines. The computer apparatus is also connected to the Internet via a LAN. The copying machines 4 connected to the users' data terminals 1 are managed by the center.

[2] Control

The control performed by the management system will be described with reference to flowcharts. Here, phrases "on edge" and "off edge" are defined. A condition change where the condition of a switch, a sensor, a signal or the like is changed from off to on will be referred to as "on edge", and a condition change where the condition of a switch, a sensor, a signal or the like is changed from on to off will be referred to as "off edge".

[2-1] Processing at Copying Machine 4

Figure 5:
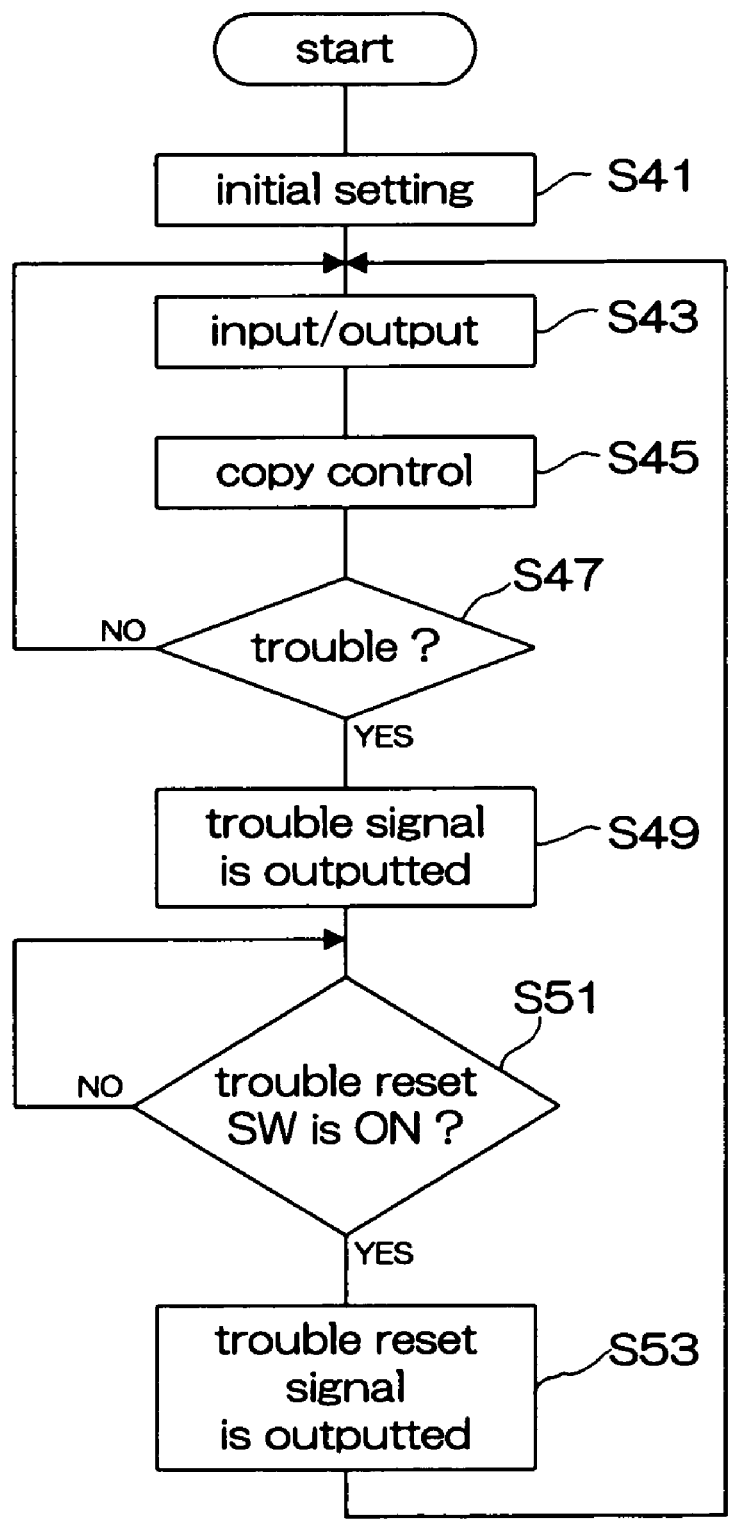
FIG. 5 is the main routine of processing performed by a CPU of a copying machine.

FIG. 5 shows the processing performed by the CPU 41 of the copying machine 4. At the CPU 41, the processing is started by turning on the power or the like. First, initial setting such as memory clearing and standard mode setting is performed (step S41), and then, steps S43 and S45 are repeated as long as no trouble occurs.

Step S43 includes processing to accept input signals and communication with the data terminal 1. The input signals include, for example, input signals from key switches on an operation panel 40 of the copying machine and the sensors 45 in various portions of the copying machine 4. In the communication with the data terminal 1, a command to change a copying machine setting condition, a command to request an operation and the like are transmitted from the data terminal 1. From the copying machine 4, the element data and the count values are transmitted to the data terminal 1.

Step S45 includes processing necessary for copying or the like, for example, control of operation members 44 such as control of paper feed, control of exposure and scanning of an original, control of the members disposed around the photoconductor drum and control of the developer unit. Step S45 also includes processing for changing setting or performing an operation based on the above-mentioned command transmitted from the data terminal 1.

When a trouble such as faulty paper conveyance (paper jam) or faulty control or operation of the apparatus occurs (YES of step S47), a signal corresponding to the occurring trouble is transmitted to the CPU 11 (step S49). When a trouble reset switch 49 is operated by an operator or the like (YES of S51), a trouble reset signal is transmitted to the CPU 11 (step S53). In response thereto, the CPU 11 performs processing described later.

[2-2] Processing at Data Terminal 1

Figure 6:
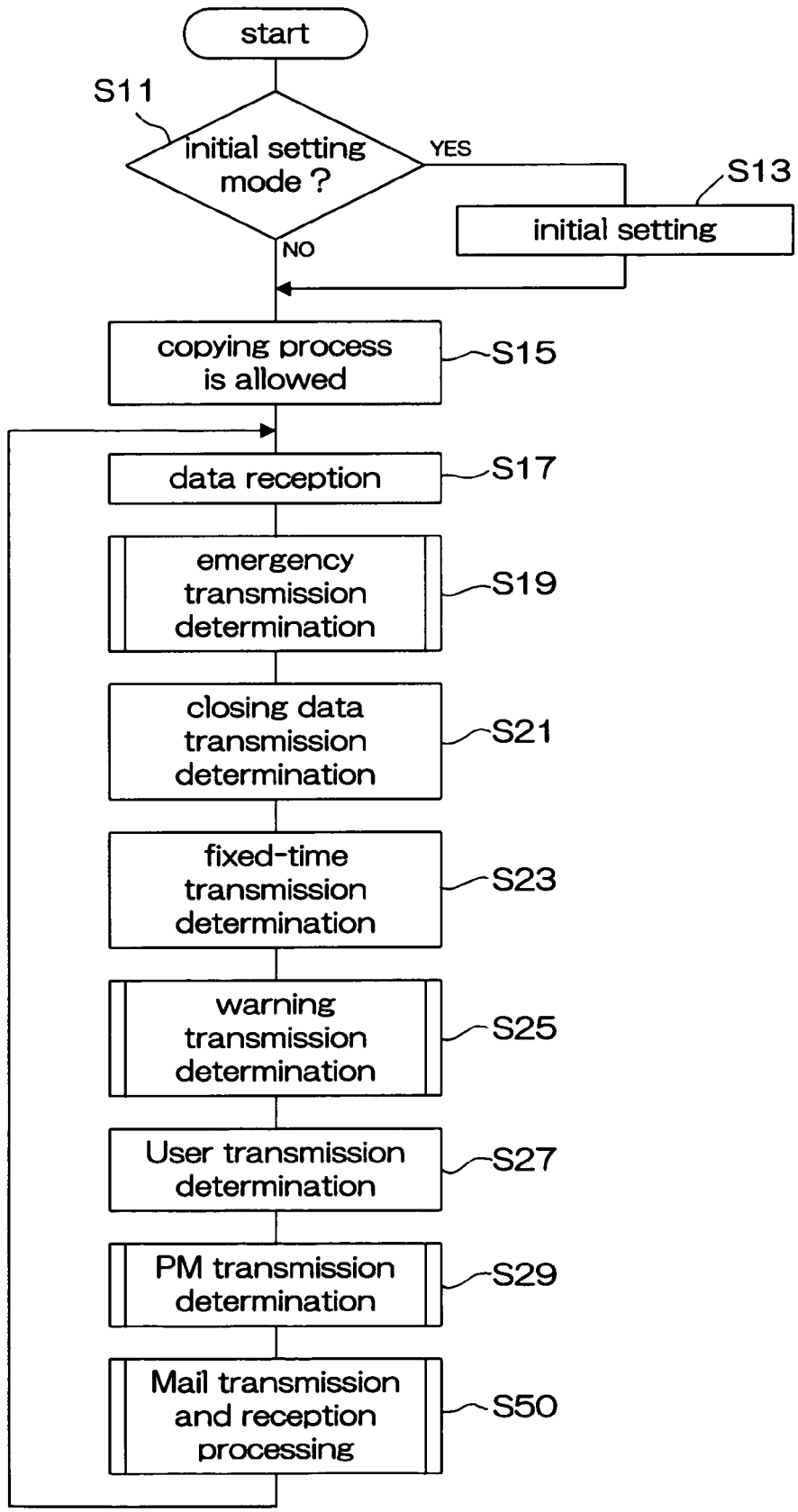
FIG. 6 is the main routine of processing performed by a CPU of a data terminal.

FIGS. 6 to 13 show the processing performed by the CPU 11 of the data terminal 1. FIG. 6 shows the main routine.

At the CPU 11, the processing is started by turning on the power. When the initial setting mode is set (YES of step S11), initial setting processing (step S13) is performed, and then, a copy enabling signal is transmitted to the CPU 41 of the copying machine (step S15). When the initial setting mode is not set (NO of step S11), the copy enabling signal is immediately transmitted (step S15). After step S15, steps S17 to S50 are repeated.

[2-2-1] Summary of Processing at Steps of FIG. 6

(a) Initial Setting (Step S13)

This processing is performed when the dip switch DIPSW4 is on at the point of time when the processing at the data terminal 1 is started, that is, when the initial mode is set (YES of step S11). In the initial setting processing, the mail address of the center, the ID number of the data terminal 1 (DTID) and the ID number of the center (center ID) are set and initial transmission is performed.

(b) Data Reception (Step S17)

Processing to receive various data on the condition of the copying machine transmitted from the CPU 41 is performed. The contents of the data are as follows: the paper ejection code; the jam/trouble code; the jam/trouble count value; the sheet-size-specific count value; the PM count value; and the element data value. The CPU 11 always holds the latest values of these data.

(c) Emergency Transmission Determination (Step S19)

Determination as to whether to transmit trouble data or trouble recovery data to the center or not or is made. Details will be given later.

(d) Closing Date Transmission Determination (Step S21)

When a predetermined closing date and time of a billing period comes, a closing date transmission flag is set. Consequently, the total count value and the sheet-size-specific count value based on which the amount billed for copying is calculated are transmitted to the center. After the transmission is finished, the next closing date transmission date and time data is returned from the center.

(e) Fixed-Time Transmission Determination (Step S23)

When a predetermined fixed-time transmission time comes, a fixed-time transmission flag is set. Consequently, the above-mentioned data on the condition of the copying machine are transmitted to the center. After the transmission is finished, the current time data and the next fixed-time transmission date and time data are returned from the center.

(f) Warning Transmission Determination (Step S25)

As described later, the element data, the count value of the jam counter and the count value of the PM counter are compared with predetermined threshold values. Based on the result of the comparison, it is determined whether to transmit warning data or warning cancel data to the center or not.

(g) User Transmission Determination (Step S27)

In the case where the initial setting mode is not set, when the push switch PUSHSW1 is depressed, a user transmission flag is set. Consequently, the above-mentioned data on the condition of the copying machine are transmitted to the center.

(h) PM Transmission Determination (Step S29)

As described later, the count value of the PM counter before the PM counter is cleared to 0 because of part replacement is transmitted to the center.

(i) Mail Transmission and Reception Processing (Step S50)

When any of the transmission flags is set, Internet mail transmission and reception to and from the center is performed. Details of the mail transmission and reception processing will be given later.

Figure 7:
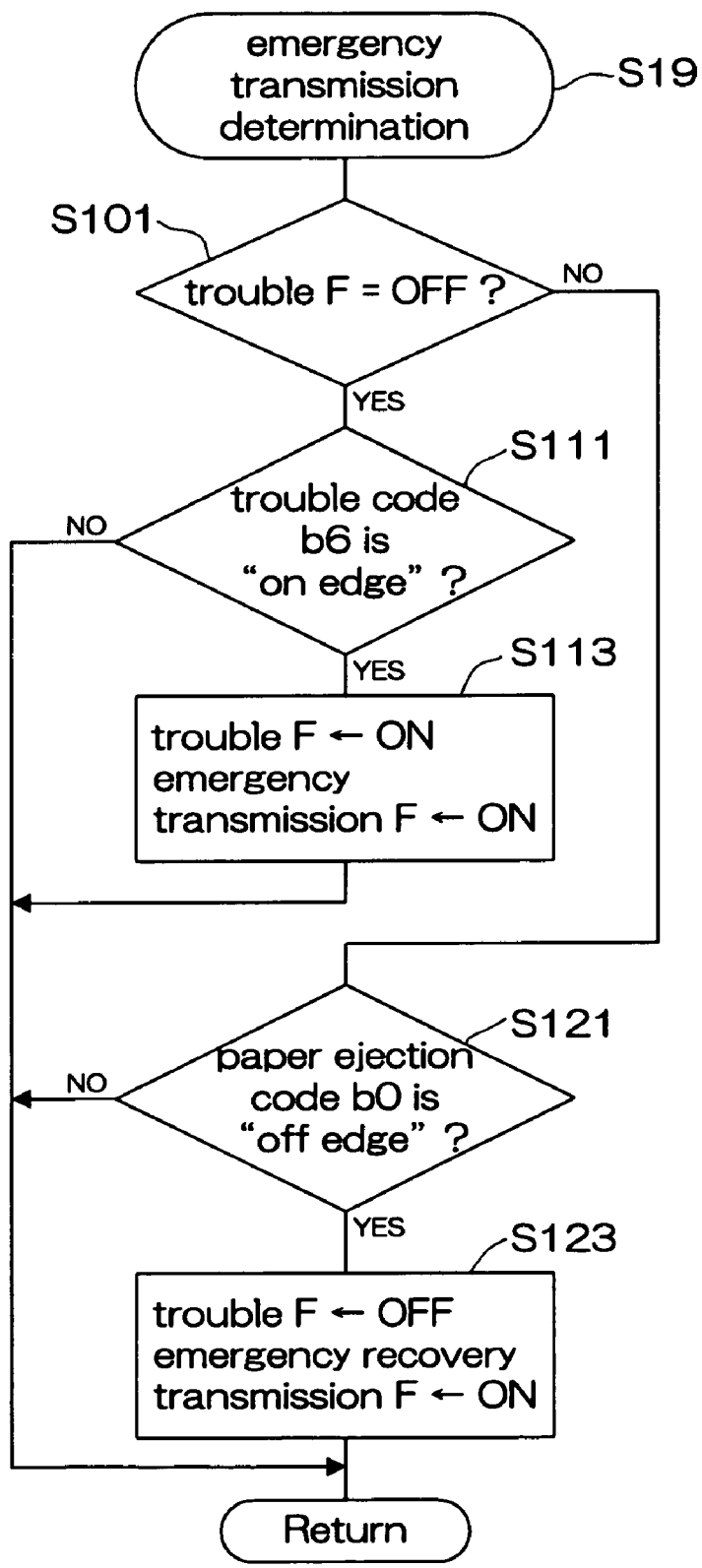
FIG. 7 is a flowchart showing emergency transmission determination processing.

[2-2-2] Emergency Transmission Determination (FIG. 7)

In this processing, emergency transmission and emergency recovery transmission are managed.

For example, when the "on edge" of the trouble code b6 from the copying machine is detected (YES of step S111) with a trouble flag being off (YES of step S101), the trouble flag and an emergency transmission flag are set (step S113).

When the "off edge" of the paper ejection code b0 from the copying machine is detected (YES of step S121) with the trouble flag being on (NO of step S101), the trouble flag is reset and an emergency recovery transmission flag is set (step S123). Processing is performed in this manner because it is when the trouble is removed that paper is ejected from the copying machine.

When the emergency transmission flag or the emergency recovery transmission flag is set, the mail transmission and reception processing (S50) is performed, so that trouble data or trouble recovery data is transmitted to the CPU 91 of the center.

Figure 8:
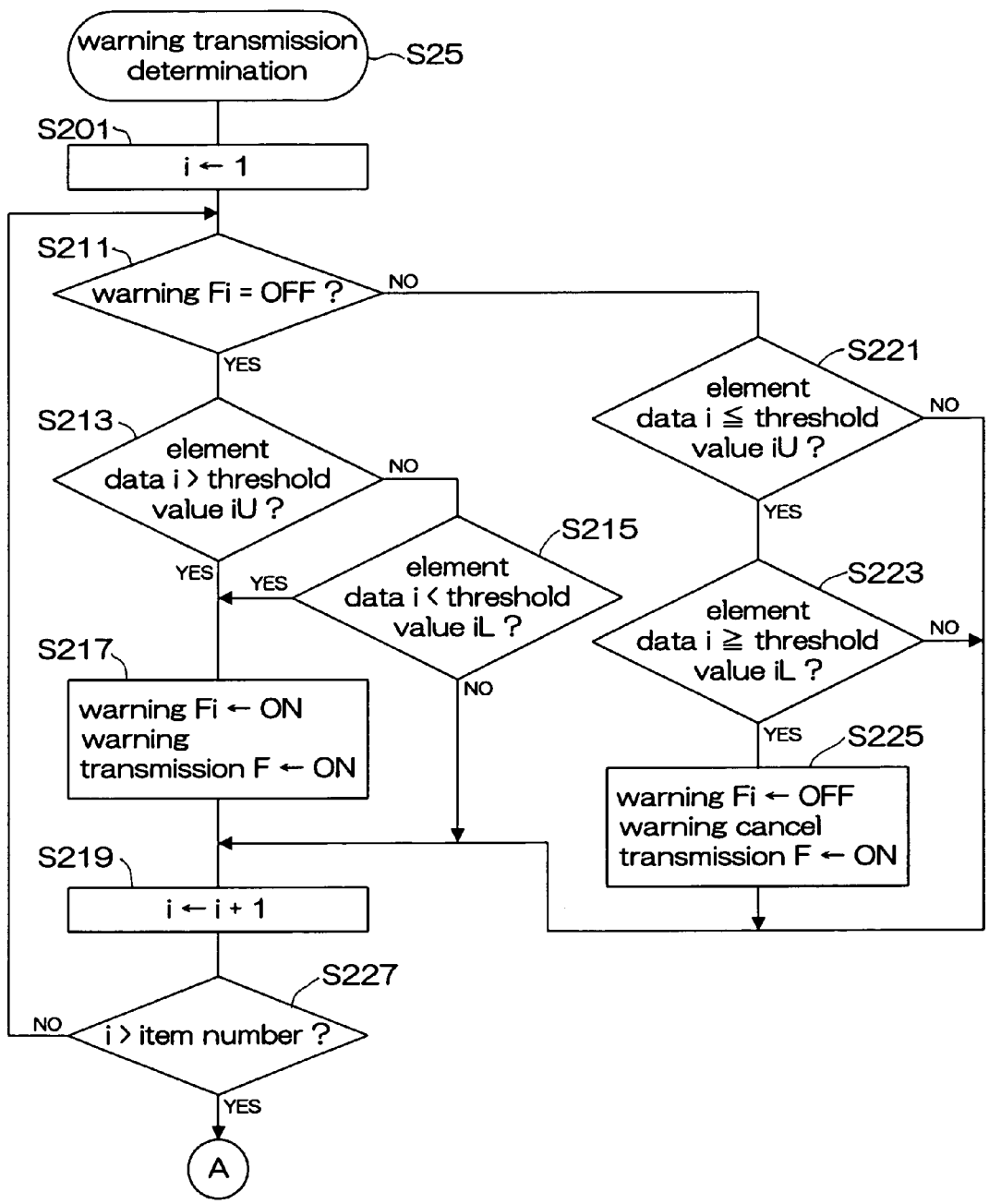
FIG. 8 is part of a flowchart showing warning transmission determination processing.
Figure 9:
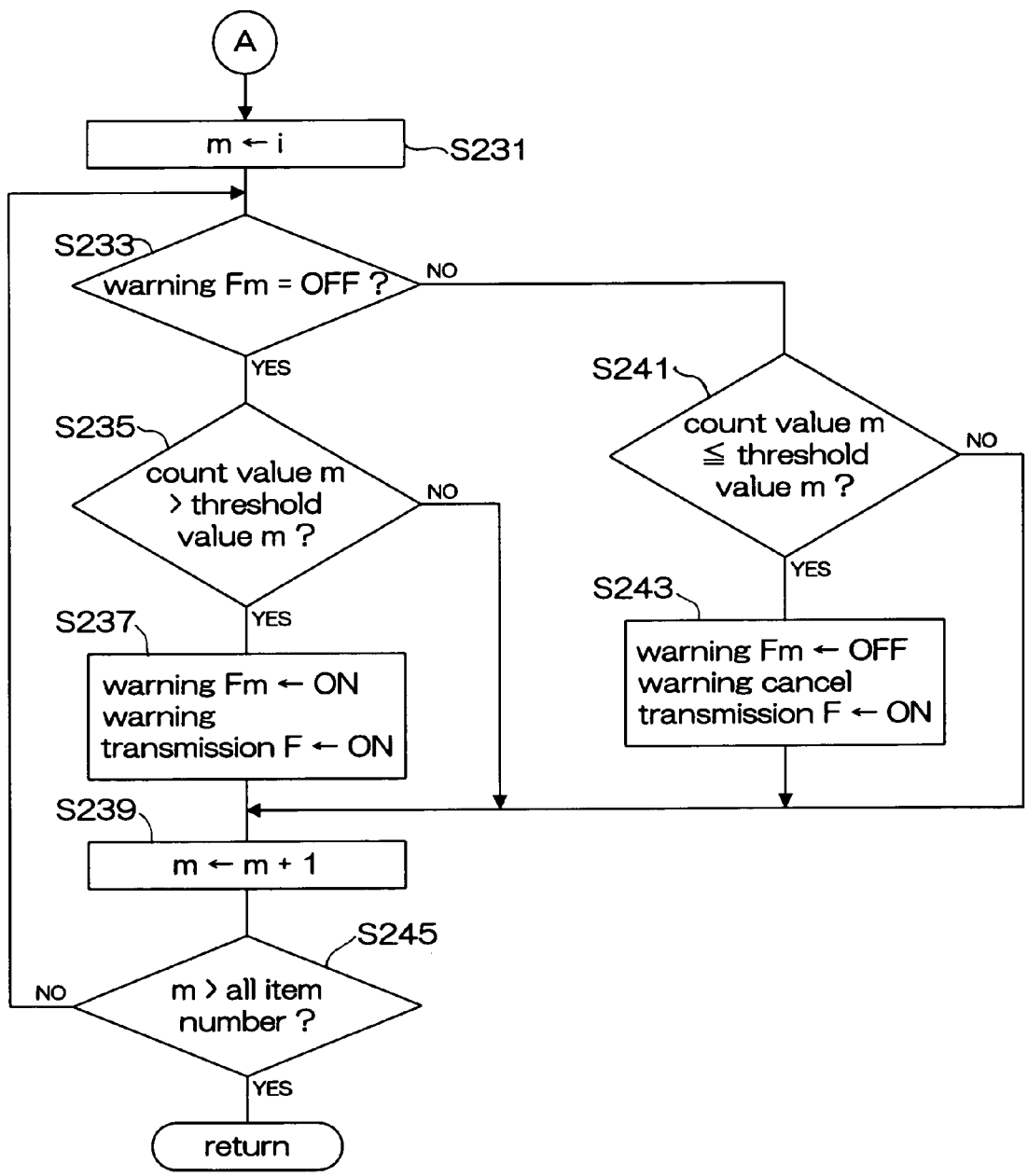
FIG. 9 is the remaining part of the flowchart showing the warning transmission determination processing.

[2-2-3] Warning Transmission Determination (FIGS. 8 to 9)

In this processing, warning transmission and warning cancel transmission are managed.

Steps S201 to S227 are processing to perform warning transmission when the value of element data is outside the permissible range particular to the element data and perform warning cancel transmission when the value recovers to a value within the permissible range.

First, an initial value "1" is set as an item number i representing the kind of the element data (step S201). Then, at step S211, the condition of the warning flag associated with the element data specified by the item number i (for the first time around, the element data of the first item) is determined. When it is determined that the warning flag associated with the element data is off (YES of step S211), it is determined whether or not the value of the element data is within the permissible range particular to the element data, in other words, whether or not it is within a range of not more than an upper limit threshold value iU and not less than a lower limit threshold value iL. When it is determined that the value is outside the permissible range (YES of step S213, or YES of step S215), a warning flag Fi associated with the element data and a warning transmission flag are set (step S217). Consequently, the mail transmission and reception processing (S50) is performed to transmit warning data to the center.

When it is determined at step S211 that the warning flag of the element data specified by the item number i is on (NO of step S211), it is determined whether the value of the element data has recovered to a value within the permissible range or not. When it is determined that the value has recovered (YES of S221 and YES of S223), the warning flag Fi associated with the element data is reset, and a warning cancel transmission flag is set (step S225). Consequently, the mail transmission and reception processing (S50) is performed to transmit the warning cancel data to the center.

When the above-described processing is performed on all the element data (YES of step S227), the processing from step S231 is performed.

Steps S231 to S245 are for performing warning transmission when the count values of the jam counter and the PM counter exceed threshold values particular thereto, and performing warning cancel transmission when the count values recover to values not more than the threshold values.

First, an initial value "i (the value of the last item number of the element data+1)" is set as an item number m representing the kind of the jam counter and the PM counter (step S231).

Then, at step S233, the condition of the warning flag associated with the jam counter or the PM counter specified by the item number m is determined. When it is determined that the warning flag associated with the jam counter or the PM counter is off (YES of step S233), it is determined whether the count value is within the permissible range particular to the counter or not, that is, whether the count value does not exceed a threshold value m or not. When it is determined that the count value exceeds the threshold value m (YES of step S235), a warning flag Fm associated with the counter and the warning transmission flag are set (step S237). In response thereto, the mail transmission and reception processing (S50) is performed to transmit the warning data to the CPU 91 of the center.

When it is determined at step S233 that the warning flag associated with the jam counter or the PM counter specified by the item number m is on (NO of step S233), it is determined whether or not the count value has recovered to a value not more than the threshold value. When it is determined that the value has recovered (YES of step S241), the warning flag Fm associated with the counter is reset, and the warning cancel transmission flag is set. In response thereto, the mail transmission and reception processing (S50) is performed to transmit the warning cancel data to the CPU 91 of the center.

When the above-described processing is performed on all the jam and PM counters (YES of step S245), the process returns to the main routine.

Warning transmission and warning cancel transmission are managed in this manner.

Figure 10:
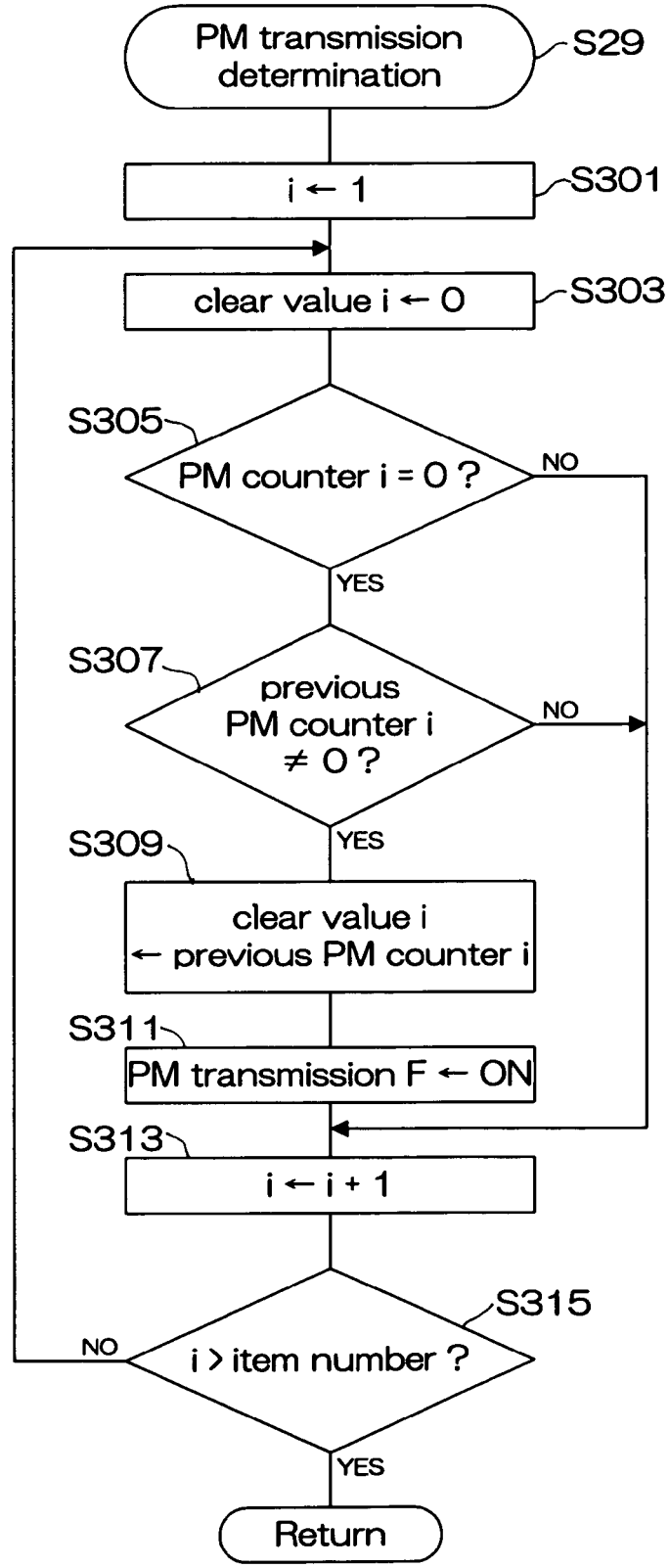
FIG. 10 is a flowchart showing PM transmission determination processing.

[2-2-4] PM Transmission Determination (FIG. 10)

In this processing, PM transmission is managed.

First, the initial value "1" is set as the item number i representing the kind of the PM counter (step S301). Then, steps S303 to S311 are performed. Thereafter, the value of i is incremented (step S313), and the above-described processing is repeated. That is, the above-described processing is repetitively performed successively on different kinds of PM counters.

Steps S303 to S311 are for, when the PM counter is cleared (YES of step S305 and YES of step S307), saving the count value of the PM counter immediately before the PM counter is cleared (step S309), and setting a PM transmission flag (step S311). The PM counter is cleared by the serviceperson when the part corresponding to the PM counter is replaced.

When the PM transmission flag is set (step S311), the mail transmission and reception processing (S50) is performed to transmit PM data (the kind of the replaced part and the counter value immediately before the replacement) to the center.

Figure 11:
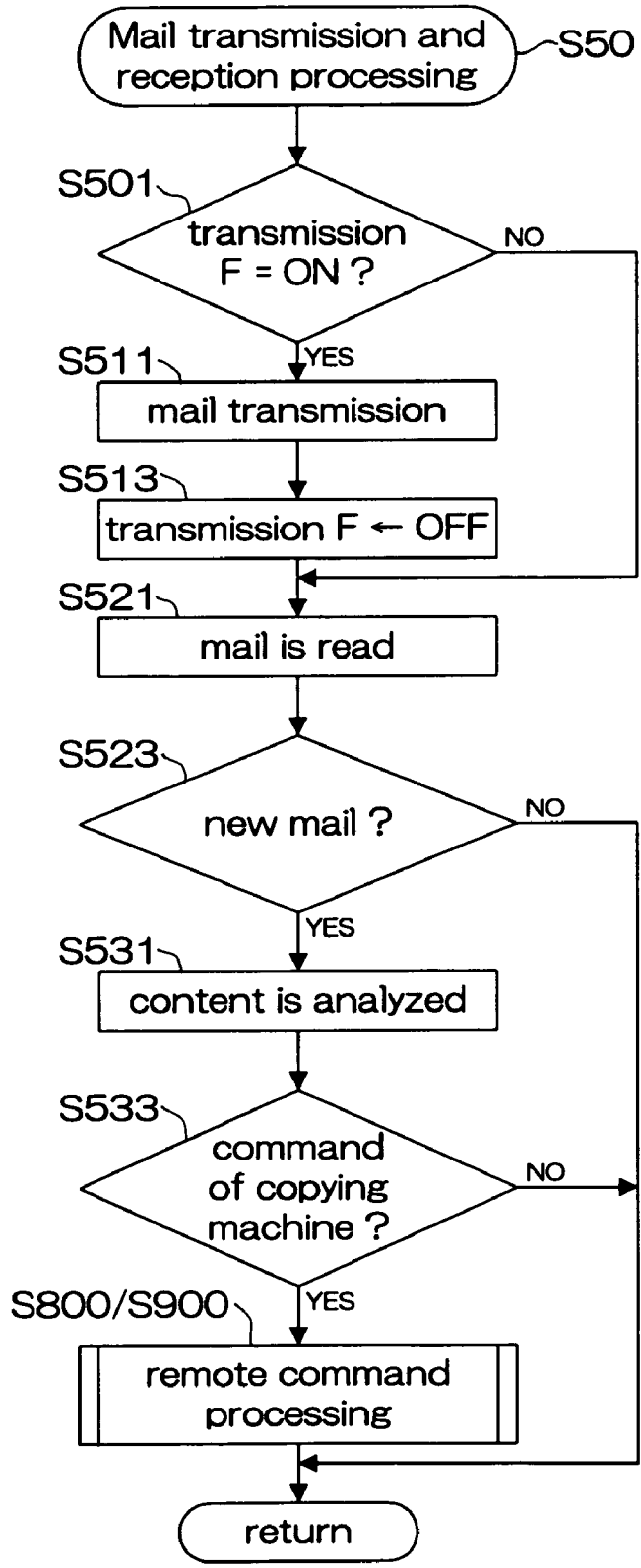
FIG. 11 is a flowchart showing mail transmission and reception processing.
Figure 12:
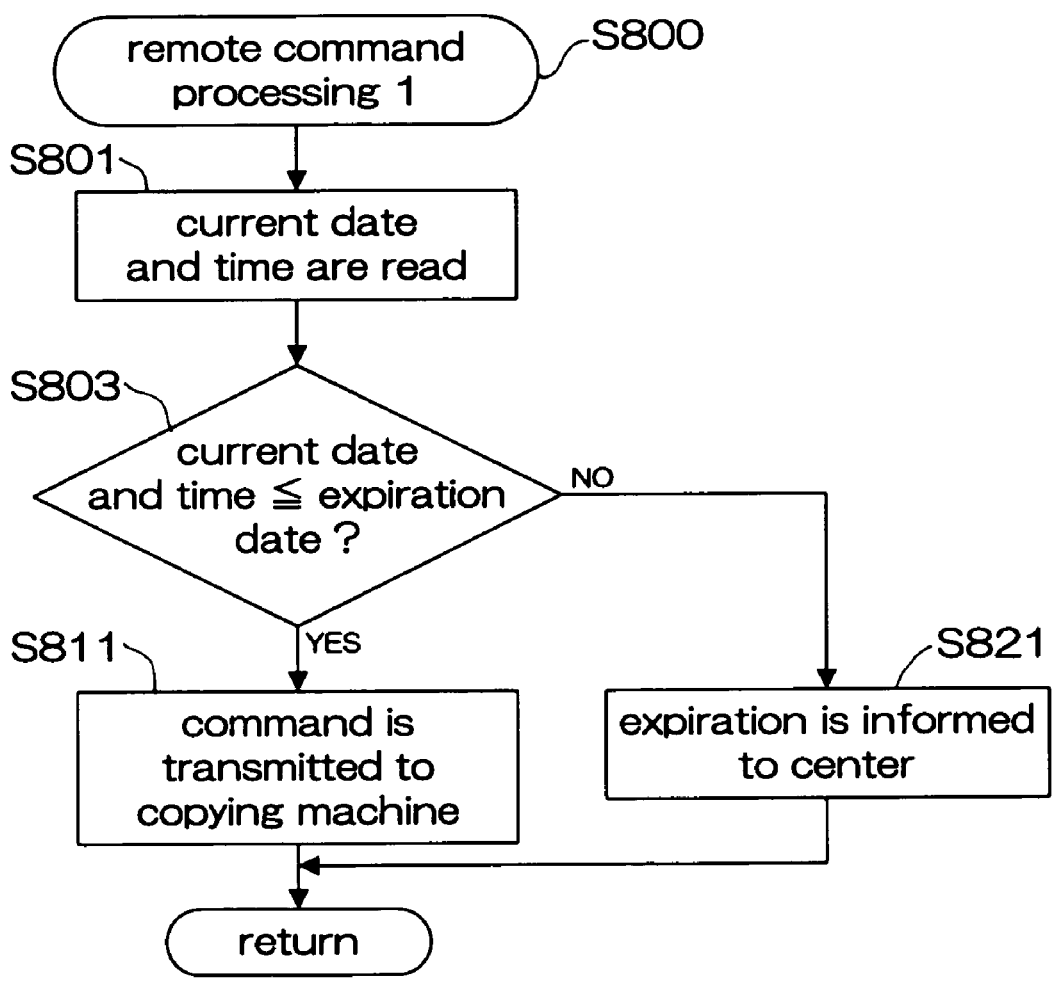
FIG. 12 is a flowchart showing a first example of remote command processing.
Figure 13:
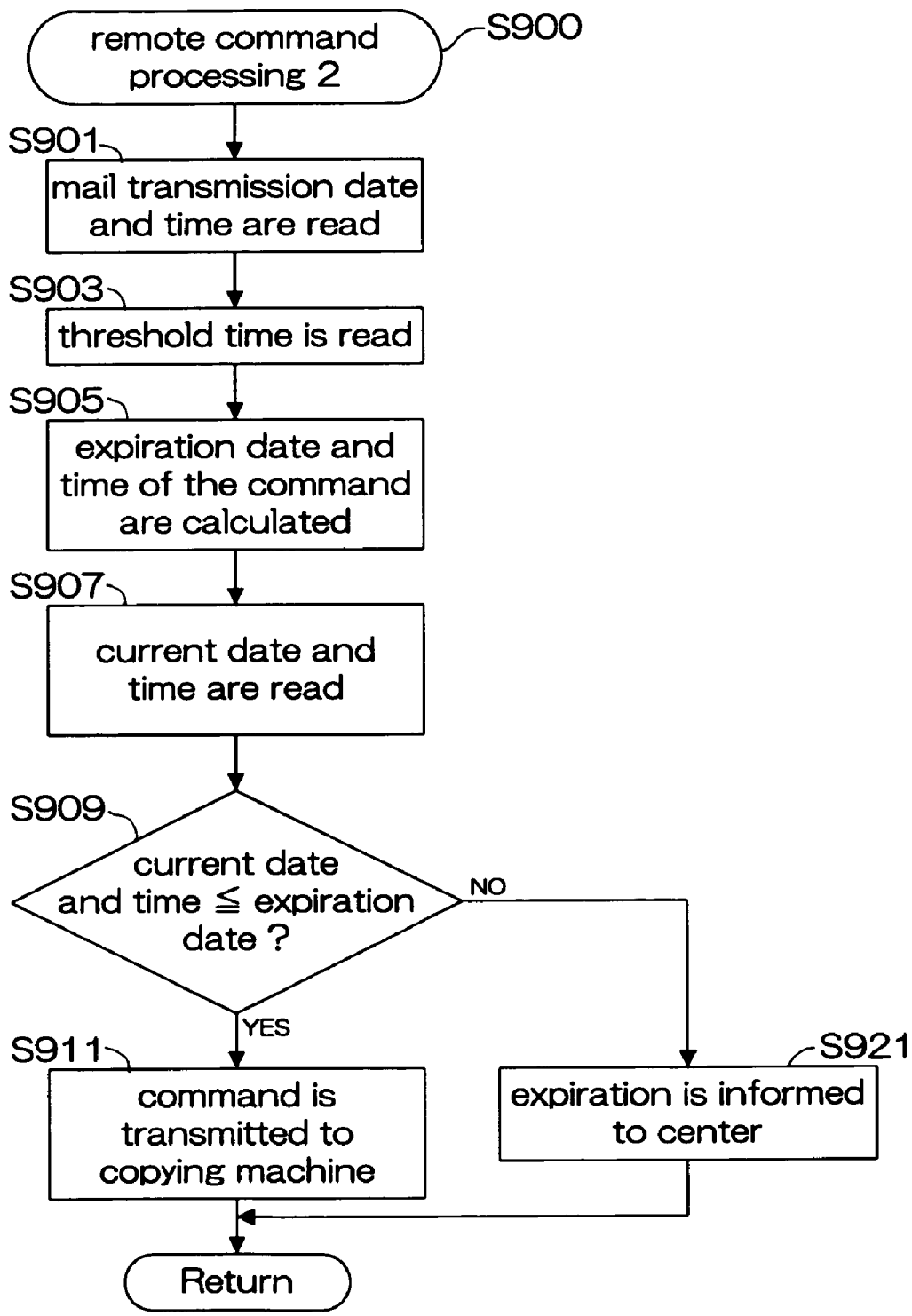
FIG. 13 is a flowchart showing a second example of the remote command processing.

[2-2-5] Mail Transmission and Reception Processing (FIGS. 11 to 13)

When any of the transmission flags is set at the data terminal 1, the data corresponding to the transmission flag is sent out to the Internet as packet data to which the address of the center is added. Moreover, the packet data transmitted from the center to the data terminal is read.

First, when any of the transmission flags is set (YES of step S501), the data corresponding to the set transmission flag is transmitted to the center as an Internet mail (step S511). That is, the data is sent out to the Internet as packet data to which the address of the center is added. Then, the transmission flag is reset (step S513). When the transmission of the mail is a failure, the mail is re-transmitted (not shown).

At step S521, whether there is a newly-arrived mail addressed to the data terminal 1 or not is read from the mail server 33. When there is a newly-arrived mail addressed to the data terminal 1 (YES of step S523), the mail is read from the mail server 33 and the content thereof is analyzed (step S531). Examples of the contents of mails transmitted from the center to the data terminal 1 include a command to change the setting condition of the copying machine (setting change command), a command to request the copying machine to operate (operation command), the current time, the next fixed-time transmission date and time, and the next closing date transmission date and time. When there is no newly-arrived mail addressed to the data terminal 1 (NO of step S523), the mail transmission and reception processing is finished.

When it is determined as a result of the analysis at step S531 that the mail includes the setting change command or the operation command (YES of S533), the command is processed by either of subsequently-described remote command processings (the processing of FIG. 11 or the processing of FIG. 12). When the mail read at step S531 includes neither the setting change command nor the operation command (NO of step S533), the mail transmission and reception processing is finished.

[2-2-5-1] Remote Command Processing (FIG. 12)

The remote command processing shown in FIG. 12 is performed when the data transmitted from the center includes expiration date and time information. In this case, it is unnecessary for the data terminal 1 to hold threshold value information representing the period for which the command is valid, but the data terminal 1 obtains the time from the clock IC 17 and compares it with the expiration date and time information.

When the setting change command or the operation command is included in the mail received from the center, first, the date and time is read from the clock IC 17 (step S801). Then, the date and time read at step S801 and the expiration date and time added to the command are compared (step S803).

When the date and time is not past the expiration date and time (YES of step S803), the command and its parameters are transmitted to the CPU 41 via the serial I/F 12 and the serial I/F 42 (step S811). Consequently, the processing corresponding to the command is performed at the copying machine 4 at step S43 of FIG. 5.

When the date and time is past the expiration date and time (NO of step S803), a mail saying that is transmitted to the center at step S821. In this case, the command received from the center is not executed.

[2-2-5-2] Remote Command Processing (FIG. 13)

The remote command processing shown in FIG. 13 is performed when the data transmitted from the center does not include the expiration date and time information but includes the transmission date and time. In this case, it is necessary for the data terminal 1 to hold the threshold information representing the period for which the command is valid. The threshold value information is added to the transmission time of the center, and the result of the addition is compared with the time obtained from the clock IC 17.

When the setting change command or the operation command is included in the mail received from the center, first, the transmission date and time of the mail is read from the date field of the header section of the mail (step S901).

Then, at step S903, a threshold value time for deciding whether to execute the command or not based on the time that elapsed from the transmission of the command by the center to the reception of the command by the data terminal 1 is read from the non-volatile memory 16. At the next step S905, the threshold time read at step S903 is added to the transmission date and time of the mail to calculate the expiration date and time of the command.

Lastly, the date and time is read from the clock IC 17 (step S907), and the read date and time and the expiration date and time calculated at step S905 are compared (step S909). When the date and time is not past the expiration date and time (YES of step S909), the command and its parameters are transmitted to the CPU 41 via the serial I/F 12 and the serial I/F 42 (step S911). Consequently, the processing corresponding to the command is performed at the copying machine 4 at step S43 of FIG. 5. When the date and time is past the expiration date and time (NO of step S909), a mail saying that is transmitted to the center at step S921. In this case, the command received from the center is not executed.

The processings of FIGS. 12 and 13 may be replaced with each other according to whether the command transmitted from the center includes the expiration date and time information or not.

[2-3] Processing at Center

The processing performed by the CPU 91 provided in the computer 90 of the center will be described with reference to the flowcharts of FIGS. 14 and 15.

Figure 14:
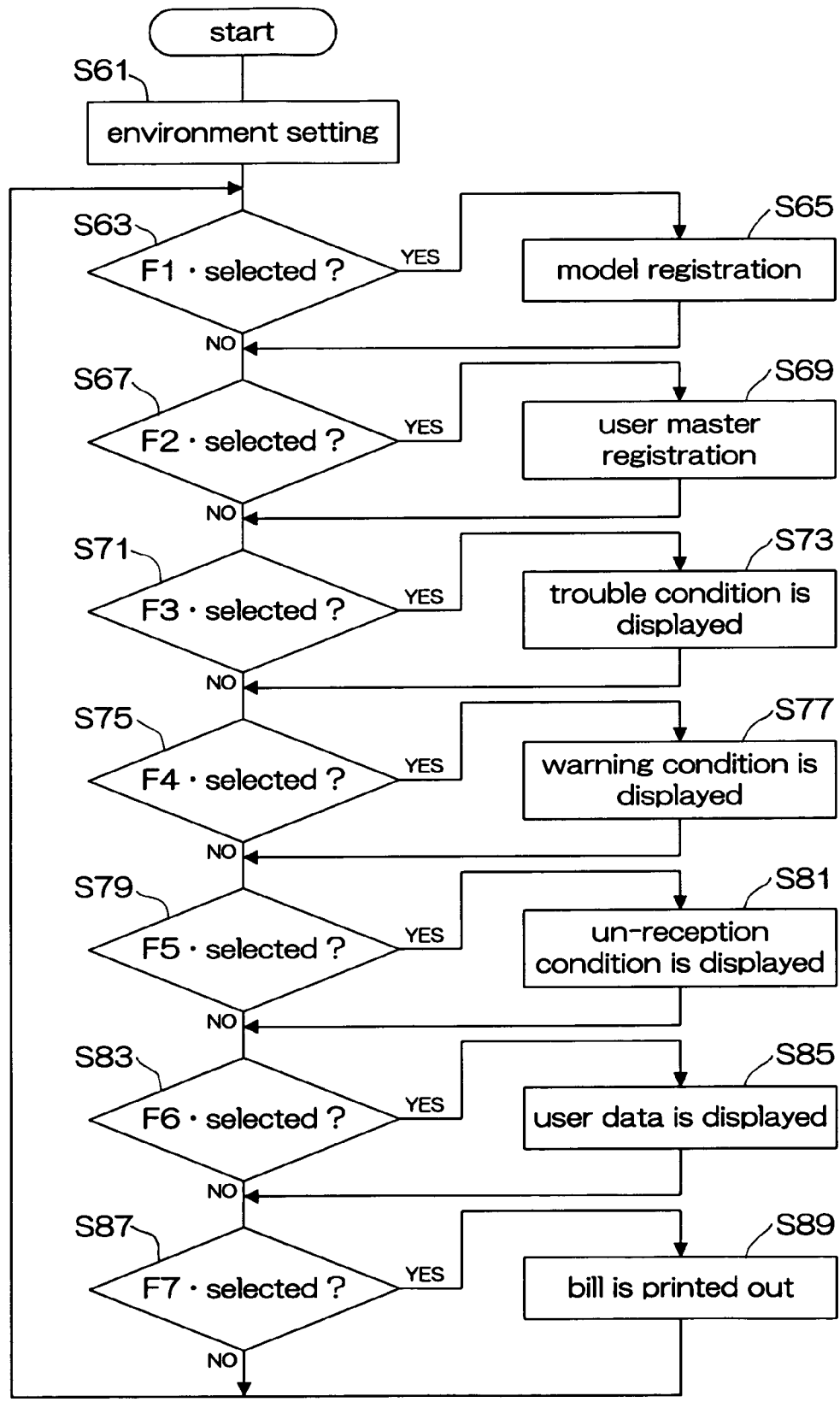
FIG. 14 is a flowchart showing processing performed by a CPU of a center.

[2-3-1] F1 to F7 Key Processing (FIG. 14)

The CPU 91 starts the processing by turning on the power. First, general environment settings are made (step S61), and then, a subsequently-mentioned mode is set or a subsequently-described processing is performed in response to a key input operation of any of keys F1 to F7.

(a) F1 Key Operation (YES of Step S63)

A model registration acceptance mode is set (step S65). That is, new registration of the model name, the number of items of the element data, the names of the element data, the standard threshold values of the element data, the standard threshold values of the count data or the like is accepted.

(b) F2 Key Operation (YES of step S67)

A user master registration acceptance mode is set (step S69). That is, new registration of the user name, the address, the telephone number, the model name, the model number, the fixed-time transmission date and time or the like is accepted. Moreover, the ID of the data terminal (DTID) is automatically set.

(c) F3 Key Operation (YES of step S71)

The trouble condition is displayed (step S73). That is, information on the user of the copying machine that performed emergency transmission (the user name, the address, the telephone number and the model name), and the date and time of occurrence of the trouble together with the content of the trouble are shown on the display 92. Irrespective of the operation of the F3 key, the number of times of trouble occurrence is always shown in a corner of the display 92.

(d) F4 Key Operation (YES of step S75)

The warning condition is displayed (step S77). That is, the information on the user of the copying machine to which warning transmission is performed together with the content of the warning is shown on the display 92. Irrespective of the operation of the F4 key, the number of times of warning is always shown in a corner of the display 92.

(e) F5 Key Operation (YES of step S79)

The un-reception condition is displayed (step S81). That is, the information on the user of the copying machine the fixed-time transmission from which is determined to be unreceived is displayed on the display 92. Irrespective of the operation of the F5 key, the number of unreceived fixed-time transmissions is always shown in a corner of the display 92.

(f) F6 Key Operation (YES of step S83)

A user data display mode is set (step S85). That is, when a user is selected, the information on the user is shown on the display 92. When a sub menu is selected, the count values of the counters (the total counter, the sheet-size-specific counter, the jam counter, the trouble counter and the PM counter) of the user's copying machine and the element data are shown month by month or item by item.

(g) F7 Key Operation (YES of step S87)

The bill is printed out (step S89). A printer (not shown) connected to the computer 90 is activated, and the amount billed for copying calculated based on the count value of the total counter and a predetermined calculation expression is printed out.

Figure 15:
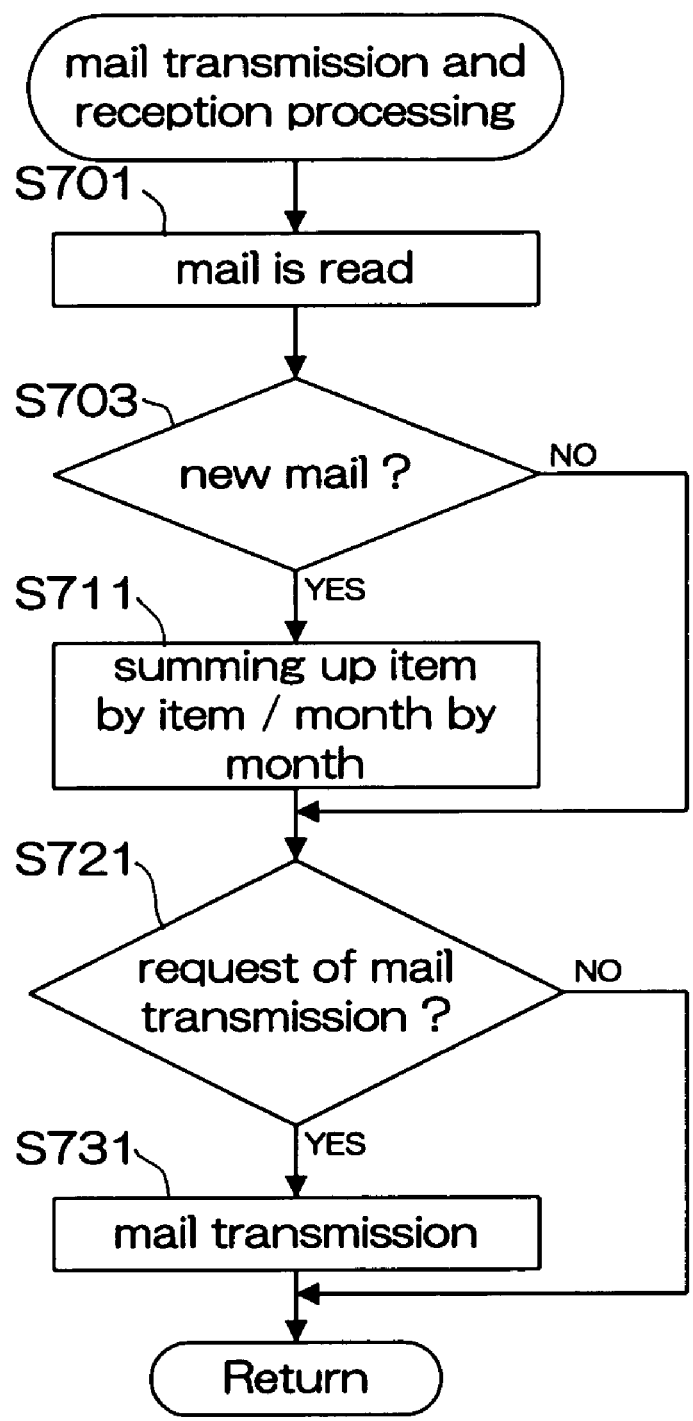
FIG. 15 is a flowchart showing mail transmission and reception processing performed by the CPU of the center.

[2-3-2] Mail Transmission and Reception Processing (FIG. 15)

Processing for the center to transmit and receive mails to and from the data terminal 1 connected to a certain copying machine 4 will be described with reference to FIG. 15.

First, whether there is a newly-arrived mail addressed to the center or not is read from the mail server 83 of the center (step S701). When there is a newly-arrived mail addressed to the center (YES of step S703), the mail is read from the mail server 83, and based on the content of the mail, summing up is performed item by item or month by month. Consequently, data for image display by selection by the operator (see step S85 of FIG. 14) is produced (step S711).

At step S721, it is determined whether data to be transmitted to the copying machine is present or not. Examples of the data to be transmitted from the center to the copying machine include the command to change the setting condition of the copying machine (setting change command), the command to request the copying machine to operate (operation command), the current time, the next fixed-time transmission date and time, and the next closing date transmission date and time. When data to be transmitted is present (YES of step S721), the data is transmitted to the data terminal of the copying machine as an Internet mail (step S731). When data to be transmitted is absent, the mail transmission and reception processing is finished. When the transmission of the mail is a failure, the mail is re-transmitted (not shown).

[2-3-2-1] Setting of Command Expiration Date and Time

Processing to provide the setting change command or the operation command with an expiration date and time on the side of the center will be described.

A method is to configure the management system so that an operator of the center can manually add an expiration date and time to the command when transmitting the command to the data terminal 1.

Another method is to configure the management system so that a predetermined threshold value time can be set for the time that elapsed from the transmission of the command to the reception of the command by the data terminal 1 in accordance with the kind of the command. The management system is configured so that when an operator of the center transmits the command to the data terminal 1, the date and time which is the sum of the threshold value time corresponding to the command to be transmitted and the transmission date and time is added as expiration date and time information. In this case, the remote command processing shown in FIG. 12 is also performed in response thereto on the side of the data terminal 1.

The above-described two methods can be combined. The management system may be configured so that when the command is transmitted to the data terminal 1, the date and time which is the sum of the threshold value time corresponding to the kind of the command to be transmitted and the transmission date and time is presented to the operator as default expiration date and time information and the operator can manually change the default information.

As described above, according to this embodiment, since transmission of the apparatus management data included in a packet to the apparatus to be managed is permitted on condition that the time at the apparatus management unit is not past the expiration date and time of the packet transmitted from the centralized management unit to the apparatus management unit via a network, the use of the data is inhibited when the data has become obsolete because of a delay in arrival of the data from the centralized management unit at the apparatus management unit. Consequently, the apparatus is prevented from being inappropriately managed based on the apparatus management data that has become obsolete.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

The invention claimed is:

1. A control device in which apparatus management data is transmitted and received to and from an apparatus by a first communicating unit, and a packet addressed to a centralized management device is sent out to a communication network and a packet from the communication network addressed to itself is taken in by a second communicating unit, said control device comprising:

a clock for providing current date and/or time;

an analyzing unit for analyzing the packet taken in by said second communicating unit;

an expiration date and/or time managing unit for permitting transmission of the apparatus management data included in the packet to said apparatus on condition that the current date and/or time obtained from said clock is not past an expiration date and/or time of the packet analyzed by said analyzing unit, and for transmitting a notice, which indicates the invalidity of the apparatus management data, to the centralized management device on condition that current date and/or time obtained from said clock is past said expiration date and/or time; and a threshold date and/or time storing unit for holding threshold date and/or time information deciding a time period for which the apparatus management data is valid, wherein said expiration date and/or time managing unit determines whether or not the current date and/or time is not past the expiration date and/or time based on a transmission date and/or time included in the packet analyzed by said analyzing unit, the threshold date and/or time information held by the threshold date and/or time storing unit and the current date and/or time obtained from said clock and when the packet does not include the expiration date and/or time, a control unit permits transmission of the control data to the apparatus on condition that current date and/or time obtained from the clock is not past a second expiration date and/or time obtained from the transmission date and/or time and the threshold date and/or time information.

2. A control device as claimed in claim 1, wherein said threshold date and/or time storing unit holds threshold date and/or time information deciding an expiration date and/or time of each apparatus management data.

3. A control device as claimed in claim 1, further comprising a decision unit for deciding whether or not the command data received by the receiving unit includes the expiration date and/or time.

4. A management system that manages apparatuses connected to a plurality of apparatus management devices by transmitting and receiving a packet including apparatus management data between a centralized management device and the apparatus management devices via a communication network, wherein said centralized management device comprises:

an expiration date and/or time setting unit for setting expiration date and/or time information of the apparatus management data; and a communication network for sending out to the communication network a packet being addressed to a specified apparatus management device and including expiration date and/or time information from the expiration date and/or time setting unit, and taking in a packet from the communication network addressed to itself, and wherein each of said plurality of apparatus management devices comprises:

a first communicating unit for transmitting and receiving the apparatus management data to and from the apparatus;

a second communicating unit for sending out a packet addressed to said centralized management device to the communication network, and taking in a packet from the communication network addressed to itself;

a clock for providing current date and/or time;

an analyzing unit for analyzing the packet taken in by said second communicating unit;

a threshold date and/or time storing unit for holding threshold date and/or time information deciding a time period for which the apparatus management data is valid; and an expiration date and/or time managing unit for permitting transmission of the apparatus management data included in the packet to the apparatus connected to said apparatus management device on condition that the current date and/or time obtained from said clock is not past an expiration date and/or time obtained from transmission date and/or time information included in the packet analyzed by said analyzing unit and the threshold date and/or time information held by said threshold date and/or time storing unit, and for transmitting a notice, which indicates the invalidity of the apparatus management data, to the centralized management device on condition that current date and/or time obtained from said clock is past said expiration date and/or time and when the packet does not include the expiration date and/or time, a control unit permits transmission of the control data to the apparatus on condition that current date and/or time obtained from the clock is not past a second expiration date and/or time obtained from the transmission date and/or time and the threshold date and/or time information.

5. A management system as claimed in claim 4, further comprising a decision unit for deciding whether or not the command data received by the receiving unit includes the expiration date and/or time.

6. A controlling method comprising the steps of:

receiving a mail transmitted from a management unit via a communication network;

providing current date and/or time from a clock;

storing threshold date and/or time information deciding a time period for which the received mail is valid;

analyzing the received mail to determine validity of the received mail, the received mail being valid when the current date and/or time obtained from said clock is not past an expiration date and/or time obtained from transmission date and/or time information included in the received mail and the threshold date and/or time information; and controlling an apparatus based on the received mail when the validity of the mail has not expired and for transmitting a notice, which indicates the invalidity of the mail, to the management unit when the validity of the mail has expired, wherein when the mail does not include the expiration date and/or time, control data is transmitted to the apparatus on condition that current date and/or time obtained from the clock is not past a second expiration date and/or time obtained from the transmission date and/or time and the threshold date and/or time information.

7. A controlling method as claimed in claim 6, further comprising a step of deciding whether or not the received command data includes the expiration date and/or time.

8. A control device for controlling an image forming apparatus comprising:

a receiving unit which receives a command from a management device via a communication network;

a clock for providing current date and/or time;

a threshold date and/or time storing unit for holding threshold date and/or time information representing a time period for which the command is valid;

a decision unit which decides whether or not the validity of the command has expired, the command being valid when the current date and/or time obtained from said clock is not past an expiration date and/or time obtained from transmission date and/or time information included in the command and the threshold date and/or time information; and a control unit which sends the command to the image forming apparatus so that the image forming apparatus performs the command when the decision unit decides that the validity of the command has not expired, wherein the control unit sends information, which indicates the invalidity of the command, to the management device via the communication network when the decision unit decides that the validity of the command has expired and the command is a command to change a setting condition of the image forming apparatus or a command to request an operation of the image forming apparatus.

9. A control device as claimed in claim 8, wherein the control unit does not control the management device based on the command when the decision unit decides that the validity of the command has expired.

10. A controller comprising:

a receiving unit receiving from a center device a transmission date and/or time and command data in a packet form;

a threshold date and/or time storing unit for holding threshold date and/or time information representing a time period for which the command is valid;

a clock for providing current date and/or time; and a control unit for transmitting the command data to the apparatus on condition that the current date and/or time obtained from the clock is not past expiration date and/or time obtained from the transmission date and/or time and the threshold date and/or time information and for transmitting a notice, which indicates the invalidity of the command data, to the center device on condition that the current date and/or time obtained from the clock is past the expiration dates wherein when the command data does not include the expiration date and/or time the control unit permits transmission of the control data to the apparatus on condition that current date and/or time obtained from the clock is not past a second expiration date and/or time obtained from the transmission date and/or time and the threshold date and/or time information.

11. A controller as claimed in claim 10, further comprising a decision unit for deciding whether or not the command data received by the receiving unit includes the expiration date and/or time.

12. A management system for managing at least one apparatus via a network, the management system comprising:

(a) a center device for managing apparatuses, the center device comprising:

(a-1) a center transmitting unit for transmitting transmission date and/or date and/or time and command data in a packet form;

(b) an terminal device for relaying the command data between the center device and the apparatus, the terminal device comprising:

(b-1) a terminal receiving unit for receiving the transmission date and/or time and the command data from the center device, (b-2) a threshold date and/or time storing unit for holding threshold date and/or time information representing a time period for which the command is valid, (b-3) a clock for providing current date and/or time, and (b-4) a control unit for transmitting the command data to the apparatus on condition that the current date and/or time obtained from the clock is not past expiration date and/or time obtained from the transmission date and/or time and the threshold date and/or time information and for transmitting a notice, which indicates the invalidity of the command data, to the center device on condition that the current date and/or time obtained from the clock is past the expiration date and/or time; and (c) an apparatus comprising:

(c-1) a apparatus receiving unit for receiving the command data, and (c-2) a apparatus control unit for controlling the apparatus corresponding to the command data, wherein when the command data does not include the expiration date and/or time the control unit permits transmission of the control data to the apparatus on condition that current date and/or time obtained from the clock is not past a second expiration date and/or time obtained from the transmission date and/or time and the threshold date and/or time information.

13. A controller comprising:

a receiving unit receiving from a center device command data including at least one of a transmission date and/or time and a first expiration date and/or time;

a threshold date and/or time storing unit for holding threshold date and/or time information representing a time period for which the command is valid;

a clock for providing current date and/or time;

a decision unit for deciding whether or not the command data received by the receiving unit includes the first expiration date and/or time, and a controller unit for transmitting the command data to an apparatus, wherein when the decision unit decides that the command data include the first expiration date and/or time, the control unit permits transmission of the command data to the apparatus on condition that the current date and/or time obtained from the clock is not past the first expiration date and/or time, and when the decision unit decides that the command data does not include the first expiration date and/or time, the control unit permits transmission of the command data to the apparatus on condition that the current date and/or time obtained from the clock is not past a second expiration date and/or time obtained from the transmission date and/or time and the threshold date and/or time information.

14. The controller according to the claim 13, wherein when the decision unit decides that the command data include the expiration date and/or time, the control unit transmits a notice, which indicates the invalidity of the command data, to the center device on condition that the current date and/or time obtained from the clock is past the first expiration date and/or time, and when the decision unit decides that the command data include the expiration date and/or time, the control unit transmits a notice, which indicates the invalidity of the command data, to the center device on condition that the current date and/or time obtained from the clock is past the second expiration date and/or time.

15. A management system for managing at least one apparatus via a network, the management system comprising:

(a) a center device for managing the at least one apparatus, the center device comprising:

(a-1) a center transmitting unit for transmitting command data including expiration date and/or time in accordance with a kind of command;

(b) an terminal device for relaying the command data between the center device and the at least one apparatus, the terminal device comprising:
- (b-1) a terminal receiving unit for receiving the command data from the center device,
- (b-2) a clock for providing current date and/or time, and
- (b-3) a control unit for permitting transmission of the command data to the at least one apparatus on condition that the current date and/or time obtained from the clock is not past the expiration date and/or time; and (c) the at least one apparatus comprising:
- (c-1) an apparatus receiving unit for receiving the command data, and
- (c-2) an apparatus control unit for controlling the at least one apparatus corresponding to the command data, wherein the command is a command to change a setting condition of the image forming apparatus or a command to request an operation of the image forming apparatus.

16. A management system according to claim 15, wherein the control unit transmits a notice, which indicates the invalidity of the command data, to the center device on condition that the current date and/or time obtained from the clock is past the expiration date and/or time.

17. A controlling method comprising the steps of:
receiving from a center device command data including at least one of a transmission date and/or time and a first expiration date and/or time;
storing threshold date and/or time information representing a time period for which the command is valid;
providing current date and/or time;
deciding whether or not the command data received by the receiving unit includes the first expiration date and/or time, and
transmitting the command data to an apparatus, wherein in the step of deciding, when the command data includes the expiration date and/or time, the transmission of the command data to the apparatus is permitted on condition that the current date and/or time obtained from the clock is not past the first expiration date and/or time, and when the command data does not include the expiration date and/or time, transmission of the command data to the apparatus is permitted on condition that the current date and/or time obtained from the clock is not past a second expiration date and/or time obtained from the transmission date and/or time and the threshold date and/or time information.

18. A method of managing at least one apparatus via a network comprising the steps of:
transmitting command data from a center device, the command data including expiration date and/or time in accordance with the kind of the command; and
receiving the command data at a terminal device and relaying the command data to the at least one apparatus, wherein the terminal device performs the steps of:
receiving the command data from the center device,
providing current date and/or time from a clock, and
permitting transmission of the command data to the at least one apparatus on condition that the current date and/or time obtained from the clock is not past the expiration date and/or time; and the at least one apparatus performs the steps of:
receiving the command data, and
controlling the at least one apparatus corresponding to the command data, wherein the command is a command to change a setting condition of the image forming apparatus or a command to request an operation of the image forming apparatus.

* * * * *